M. A. THROCKMOTON.
Corn-Marker.
No. 164,234. Patented June 8, 1875.
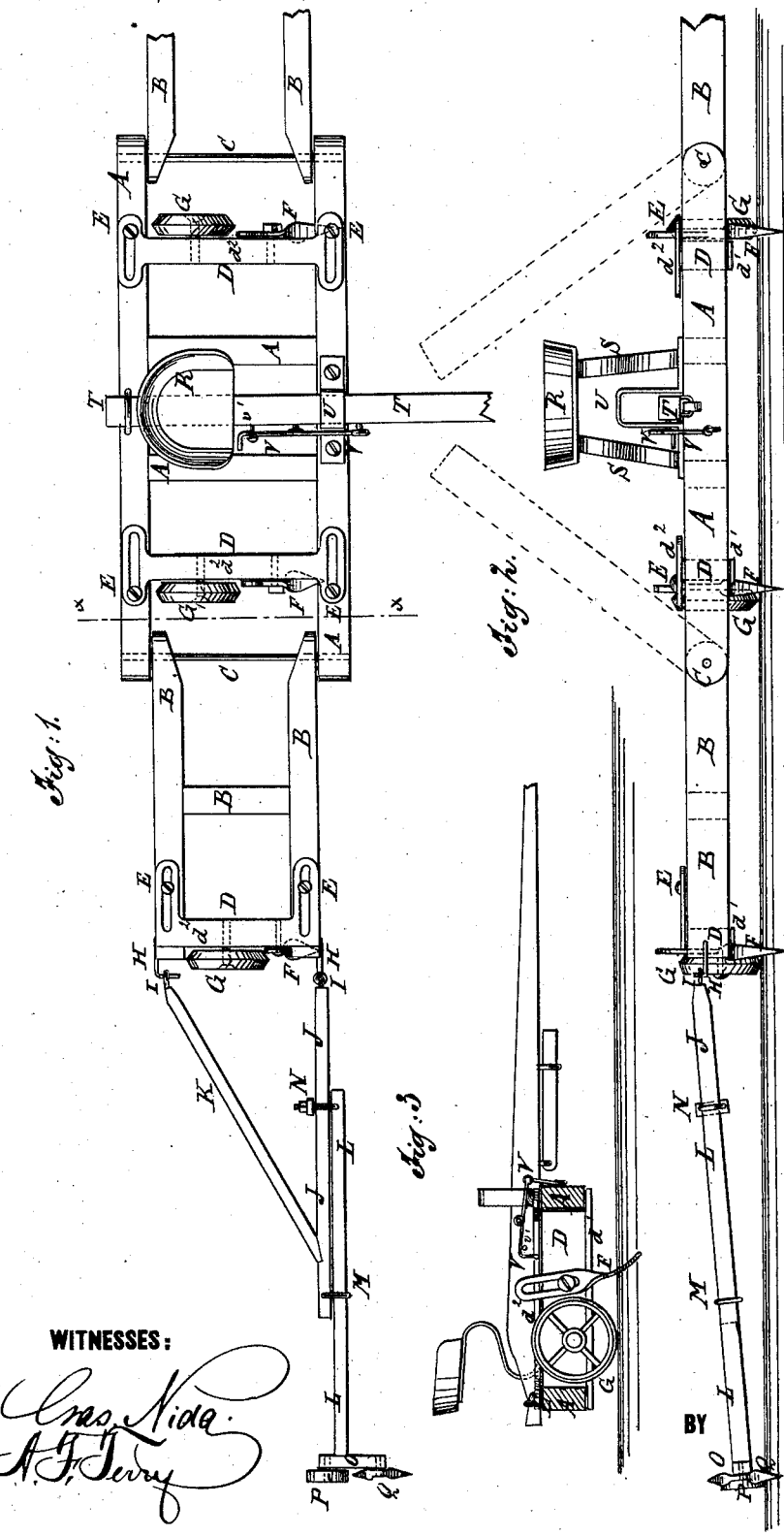
WITNESSES:
INVENTOR:
M. A. Throckmoton
BY
ATTORNEYS.

UNITED STATES PATENT OFFICE.

MILES A. THROCKMOTON, OF ANDERSONVILLE, OHIO.

IMPROVEMENT IN CORN-MARKERS.

Specification forming part of Letters Patent No. 164,234, dated June 8, 1875; application filed April 24, 1875.

*To all whom it may concern:*

Be it known that I, MILES A. THROCKMOTON, of Andersonville, in the county of Ross and State of Ohio, have invented a new and useful Improvement in Corn-Markers, of which the following is a specification:

Figure 1 is a top view of my improved marker, parts being broken away. Fig. 2 is a front view of the same. Fig. 3 is a vertical section of the same, taken through the line $x$ $x$, Fig. 1.

Similar letters of reference indicate corresponding parts.

The object of this invention is to furnish an improved implement for marking land for planting corn and other seeds to be planted in rows, which shall be simple in construction, convenient in use, and easily adjusted to make the marks at a greater or less distance apart, and of greater or less depth.

The invention consists in the combination of the adjustable bars, the bottom plates, and the slotted cross-head or L plates with the three frames; in the combination of the marking-plows and the V-faced wheels with the adjustable bars and with the three frames; in the detachable extension-frame, provided with the cross-bar, the double-pointed plow, and the wheel, with the frames, the adjustable bars, the plows, and the wheels.

A is the middle part of the frame, which consists of a front and a rear cross-bar, connected in their middle parts by two short longitudinal bars. To the projecting ends of the cross-bars of the middle frame A are pivoted the projecting ends of the cross-bars of the side frames B by rods or long bolts C, which pass through the overlapped ends of the said cross-bars. This construction allows the side frames B to be turned up over the middle frame A, for convenience in passing from place to place, and to enable the machine to pass through gateways, barways, and other narrow places. Between the end parts of the cross-bars of the middle frame A, and between the outer end parts of the cross-bars of the side frames B, are placed short longitudinal bars D, to the under sides of which are attached bars or plates $d^1$, the ends of which underlap the cross-bars of the frames A B, and thus support said frames. To the upper sides of the bars D are attached bars or plates $d^2$, the ends of which overlap the cross-bars of the frames A B, and have cross-heads or L-heads formed upon them, which are slotted to receive the bolts E, attached to the cross-bars of the said frames A B, so that by loosening the nuts of the bolts E the bars D and their attachments may be moved out or in to adjust them at the proper distance apart. To the forward parts of the outer sides of the bar D are attached plows F, to make the marks. The standards or shanks of the plows F are slotted longitudinally to receive the bolts by which they are secured to the bars D, so that they may be conveniently raised and lowered, to make shallower or deeper marks, as may be desired. To the rear parts of the bars D, and directly in the rear of the plows F, are pivoted wheels G, to support and carry the machine. The faces of the wheels G are made V-shape, so that, as they follow the marking-plows F, they may pack the soil in the bottom and sides of the marks, and make said marks distinct, so that they can be easily seen, and permanent, so that they cannot be obliterated by storms that may occur between the marking and planting. To the outer ends of the cross-bars of the side frames B are attached hooks H, to receive the eyes I, attached to the ends of the bar J, and of the inclined brace-bar K. The outer end of the brace-bar K is rigidly attached to the bar J, near its outer end. L is an extension-bar, the inner end of which overlaps the outer end of the bar J, to which it is secured adjustably by a stationary keeper, M, and a bow and yoke, N, or other clamp. To the outer end of the bar L is attached a short cross-bar, O, to the rear part of which is pivoted a small wheel, P. To the forward part of the cross-bar O is attached a double plow, Q, with a point projecting upon each side of the said cross-bar O, so that the device may be placed upon either side of the machine, as may be desired. The device is designed to make a small mark parallel with the marks made by the plows F and wheels G, to serve as a guide to the driver when using the machine, and may be extended and contracted to correspond with the adjustment of the plows and wheels F G. R is the driver's seat, the spring-standards S of which are attached to the short longitudinal bars of the middle frame A. T is the tongue, the rear end of which is hinged or pivoted to the rear cross-bar of the frame A, and which passes through a high loop or keeper, U, attached to the front cross-bar of the frame A, so that the forward part of the machine may be raised to raise the plows F from the ground for convenience in turning around, and in passing from place to place, and again lowered to drop the plows F into the soil. V is a lever, the forward end of which is connected with the forward cross-bar of the frame A. The lever V is pivoted to the side of the tongue T, and its rear end projects into such a position that it may be readily reached and operated by the driver with his foot while sitting upon the seat R. $v'$ is a catch, attached to the tongue T in such a position that the lever V may be caught upon it and locked when holding the forward part of the machine raised.

Having thus described my invention, I claim as new and desire to secure by Letters Patent—

1. The combination of the adjustable bars D, the bottom plates $d^1$, and the slotted cross-head or L plates $d^2$ with the frames A B B, substantially as herein shown and described.

2. The combination of the marking-plows F and the V-faced wheels G with the adjustable bars D $d^1$ $d^2$, and with the frames A B B, substantially as herein shown and described.

3. The detachable extension-frame J K L, provided with the cross-bar O, the double-pointed plow Q, and the wheel P, in combination with the frames A B C, the adjustable bars D $d^1$ $d^2$, the plows F, and the wheels G, substantially as herein shown and described.

MILES A. THROCKMOTON.

Witnesses:
JOSEPH HIRN,
E. K. MICK.